(12) United States Patent
Chan et al.

(10) Patent No.: US 8,055,607 B2
(45) Date of Patent: Nov. 8, 2011

(54) ADAPTIVE MULTI-LEVELS DICTIONARIES AND SINGULAR VALUE DECOMPOSITION TECHNIQUES FOR AUTONOMIC PROBLEM DETERMINATION

(75) Inventors: Hoi Y. Chan, New Canaan, CT (US); Thomas Y. Kwok, Township of Washington, NJ (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 12/041,353

(22) Filed: Mar. 3, 2008

(65) Prior Publication Data

US 2009/0222396 A1  Sep. 3, 2009

(51) Int. Cl.
*G06F 15/18* (2006.01)
(52) U.S. Cl. ............... 706/62; 706/45; 706/46; 708/514; 708/520
(58) Field of Classification Search .................. None
See application file for complete search history.

(56) References Cited

U.S. PATENT DOCUMENTS

| | | | |
|---|---|---|---|
| 5,675,819 A | 10/1997 | Schuetze | |
| 6,560,597 B1 | 5/2003 | Dhillon et al. | |
| 6,611,825 B1 | 8/2003 | Billheimer et al. | |
| 6,701,305 B1 | 3/2004 | Holt et al. | |
| 6,792,456 B1 | 9/2004 | Hellerstein et al. | |
| 2004/0059966 A1 | 3/2004 | Chan et al. | |
| 2004/0178951 A1* | 9/2004 | Ponsford et al. | 342/192 |
| 2004/0243692 A1 | 12/2004 | Arnold et al. | |
| 2004/0243699 A1 | 12/2004 | Koclanes et al. | |
| 2005/0091356 A1 | 4/2005 | Izzo | |
| 2005/0256947 A1 | 11/2005 | Devarakonda et al. | |
| 2006/0236061 A1 | 10/2006 | Koclanes | |
| 2007/0019754 A1* | 1/2007 | Raleigh et al. | 375/260 |
| 2007/0033273 A1 | 2/2007 | White et al. | |
| 2007/0083509 A1 | 4/2007 | Wu et al. | |

(Continued)

OTHER PUBLICATIONS

Kwok et al. "An autonomic problem determination system using adaptive multi-levels dictionaries and singular value decomposition techniques", International Journal of Autonomic Computing, 2009, pp. 50-57.*

(Continued)

*Primary Examiner* — Omar Fernandez Rivas
*Assistant Examiner* — Omar F Fernandez Rivas
(74) *Attorney, Agent, or Firm* — Scully, Scott, Murphy & Presser, P.C.; Daniel P. Morris, Esq.

(57) ABSTRACT

A system and method for autonomic problem determination. Events and problems associated with the events are received from a computing resource and are expressed as entries in an event-problem matrix. Expert knowledge is expressed as entries in one or more multi-level structure dictionaries. The system and method enables dynamic interaction between the events in the matrix and the current dictionaries with its entries being updated continuously to maximize correlation among the events and problems. The index of each term in the dictionary is used to calculate the weight of each event in the matrix wherein events having frequent association with a specific problem will be given a higher weight in the matrix. Using singular value decomposition (SVD), the weighted events enable an accelerated and accurate convergence to a set of specific associated problems. Feedback, responsive to the output of the problem determination, is provided to trigger the recalculation of the index of each associated term in the dictionaries, resulting in gradual evolution of the dictionaries to accumulate expert knowledge.

20 Claims, 3 Drawing Sheets

U.S. PATENT DOCUMENTS

| | | | |
|---|---|---|---|
| 2007/0140374 A1* | 6/2007 | Raleigh et al. | 375/267 |
| 2008/0125045 A1* | 5/2008 | Nakao | 455/42 |
| 2008/0133982 A1* | 6/2008 | Rawlins et al. | 714/699 |
| 2008/0183090 A1* | 7/2008 | Farringdon et al. | 600/509 |
| 2009/0216821 A1* | 8/2009 | Nakamura et al. | 708/446 |

OTHER PUBLICATIONS

Chan et al., "Adaptive Multi-levels Dictionaries and Singular Value Decomposition Techniques for Autonomic Problem Determination", Fourth International Conference on Autonomic Computing, 2007, 2 pages.*

Chan et al., "Autonomic ranking and selection of web services by using single value decomposition technique", IEEE International Conference on Web Services, 2008, pp. 661-666.*

Chan et al.,"A Policy-based Management System with Automatic Policy Selection and Creation Capabilities by using Singular Value Decomposition Technique", IBM Thomas J. Watson Research Center, 19 Skyline Drive, Hawthorne, NY 10532 , 4 pages.

J.O. Kephart and D.M. Chess entitled The Vision of Autonomic Computing. IEEE Computer Magazine, Jan. 2003, pp. 41-50.

J.O. Kephart and We. Walsh, "An AI Perspective on Autonomic Computing Policies", Policies for Distributed Systems, Networks, Jun. 7-9, 2004, 10 pages.

A.K. Bandara, E.C. Lupu, J. Moffett, A. Russo, "A Goal-based Approach to Policy Refinement", Proceedings 5th IEEE Policy Workshop (Policy 2004), Jun. 1996, pp. 1-11.

L.P. Kaelbling, M. Littman, A. Moore, "Reinforcement Learning: A Survey", Journal of Artificial Intelligence Research, vol. 4, May, 1996, pp. 237-285.

* cited by examiner

|    | P1 | P2 | P3 | P4 | P5 |
|----|----|----|----|----|----|
| E1 | 1  | 1  |    | 1  |    |
| E2 | 1  |    |    | 1  |    |
| E3 |    |    |    |    | 1  |
| E4 |    | 3  |    |    |    |
| E5 |    | 3  | 3  |    |    |
| E6 | 1  |    |    |    | 1  |
| E7 |    |    | 1  |    |    |
| E8 | 1  |    |    |    |    |
| E9 |    |    |    |    | 1  |

FIG. 2

ADAPTIVE MULTI-LEVELS DICTIONARIES AND SINGULAR VALUE DECOMPOSITION TECHNIQUES FOR AUTONOMIC PROBLEM DETERMINATION

BACKGROUND OF THE INVENTION

1. Field of the Invention

The present invention relates generally to autonomic computing systems and, more particularly, to improved systems and methods for autonomic problem determination.

2. Description of the Prior Art

An autonomic problem determination system (PDS) can adapt to changing environments, react to existing or new error condition and predict possible problems. Traditional problem determination systems rely on static rules and patterns to recognize problems, which is insufficient in detecting new, ambiguous error conditions, and is not able to adapt to new environments. New rules and patterns must be authored to reflect new operation environments and error conditions, which is costly to maintain and slow to respond. Standard Singular Value Decomposition has been explored to solve this problem. SVD is a classical statistical method and is widely used in latent semantic analysis for information retrieval. Its use in autonomic systems has been explored recently. However, these prior studies did not consider the use of expert and learned knowledge to enhance search time and accuracy. While SVD works well in static environment, its accuracy is unpredictable and computationally expensive in new and ambiguous situations.

It would be highly desirable to provide an improved system and method for autonomic problem determination.

It would be highly desirable to provide an improved system and method for autonomic problem determination that is adaptive and implements adaptive multilevel dictionaries and single value decomposition techniques that can react to new or ambiguous error situations and predict possible problems, and adapt to new environments.

SUMMARY OF THE INVENTION

It is an object of the present invention to provide an improved system and method for autonomic problem determination.

It is an object of the present invention to provide an improved system and method for autonomic problem determination that uses Singular Value Decomposition techniques (SVD) together with an adaptive multi-levels dictionaries system (DD) that can react to new or ambiguous error situations and predict possible problems, and adapt to new environments.

The present invention relates generally to a system, method and computer program product for autonomic problem determination where dynamic and adaptive multi-levels dictionaries and "Singular Value Decomposition" (SVD) techniques are used for problem determination in autonomic computing systems. In particular, the system utilizes an iterative method that enables dynamic interaction between events and the current dictionaries with its entries being continuously updated. Updating the dictionaries triggers an update of the SVD matrix, thereby accelerating its convergence. The system captures knowledge in a hierarchical form for complex knowledge representation. It does not require a formal knowledge model or intensive training by examples. It is efficient with sufficient accuracy for autonomic problem determination.

Thus in one aspect, the system of the invention implements an iterative method that enables dynamic interaction between events and the current dictionaries with its entries being continuously updated. Updating the dictionaries triggers an update of the SVD matrix, thereby accelerating its convergence. The system captures knowledge in a hierarchical form for complex knowledge representation. It does not require a formal knowledge model or intensive training by examples. It is efficient with sufficient accuracy for autonomic problem determination.

According to one aspect of the invention, there is provided a computer implemented method and system for problem determination in a computing system, the method comprises:

providing a database accessible by a computer device;

providing to the database data representing events and problems patterns received from a computing system resource, the problem determining comprising associating a potential source of problems with received events;

configuring received events and potential problems associated with these events as entries into an adaptive event-problem (EP) matrix;

providing a storage device having dictionary entries comprising a weighting factor associated with one or more terms in the EP matrix and representative of the relative importance of the one or more terms;

applying a weighting factor to the one or more terms in the EP matrix; and, utilizing a Singular Value Decomposition on the EP matrix having the weighted terms to construct an event-problem data structure representing an event-problem vector space comprising associative patterns and correlations in the event-problem data, wherein the use of weighted terms in the SVD technique enables an accelerated and accurate convergence to a set of specific associated problems for accurate and rapid problem determination.

Further to this aspect, the computer implemented method further comprises: updating one or more current weighting factor entries to maximize correlation among the events and problems.

Furthermore the weighting factor associated with one or more terms in an EP matrix comprises an Occurrence Index (OI) representative of that term's relative importance, the OI index of each term in the dictionary being used to calculate the weight of each event in the EP matrix. The OI is a value governed according to:

$$OI = (F*B)/T$$

where F is the occurrence frequency of the term for a fixed time interval, B is a user input real number greater than zero (0) and having a default value of one (1), and T is a time elapsed since the last occurrence of the term.

Furthermore, the computer implemented method further comprises: updating each OI for each term at the multi-levels dictionary as events are received and problems detected.

With respect to the multi-level dictionary, the dictionary storage device is a multi-level structure dictionary includes entries expressing terms in increasing complexity for assigning weights to the EP matrix terms, wherein a first level dictionary contains includes atomic terms, and a higher level dictionary includes combination of terms.

Furthermore, the updating comprises: utilizing a feedback mechanism in which an output of the problem determination triggers the recalculation of the OI of each associated term in the dictionaries. This advantageously results in gradual evolution of the dictionaries to accumulate expert knowledge. Thus, for example, a successful problem determination situation will increase the weights of the related terms, while a failed problem determination situation will decrease the weights of the related terms, resulting in adaptive behavior.

BRIEF DESCRIPTION OF THE DRAWINGS

The objects, features and advantages of the present invention will become apparent to one skilled in the art, in view of the following detailed description taken in combination with the attached drawings, in which:

FIG. 2 depicts an example EP Matrix for an example 9 event/5 problem set including weights assigned after Dictionary lookup;

DETAILED DESCRIPTION OF THE PREFERRED EMBODIMENTS

The present invention is directed to a system and method for autonomous problem determination.

The problem determination system (PDS) of the present invention implements Singular Value Decomposition techniques (SVD) together with an adaptive multi-levels dictionaries system (DD) that can react to new or ambiguous error situations and predict possible problems, and adapt to new environments.

The PDS system and method enables dynamic interaction between events and the dictionaries with its entries being continuously updated to maximize correlation among the data. The concept of "occurrence index" is further implemented which is a user defined frequency and time based weighting factor assigned to each dictionary entry to reflect its relative importance.

Figure 1:
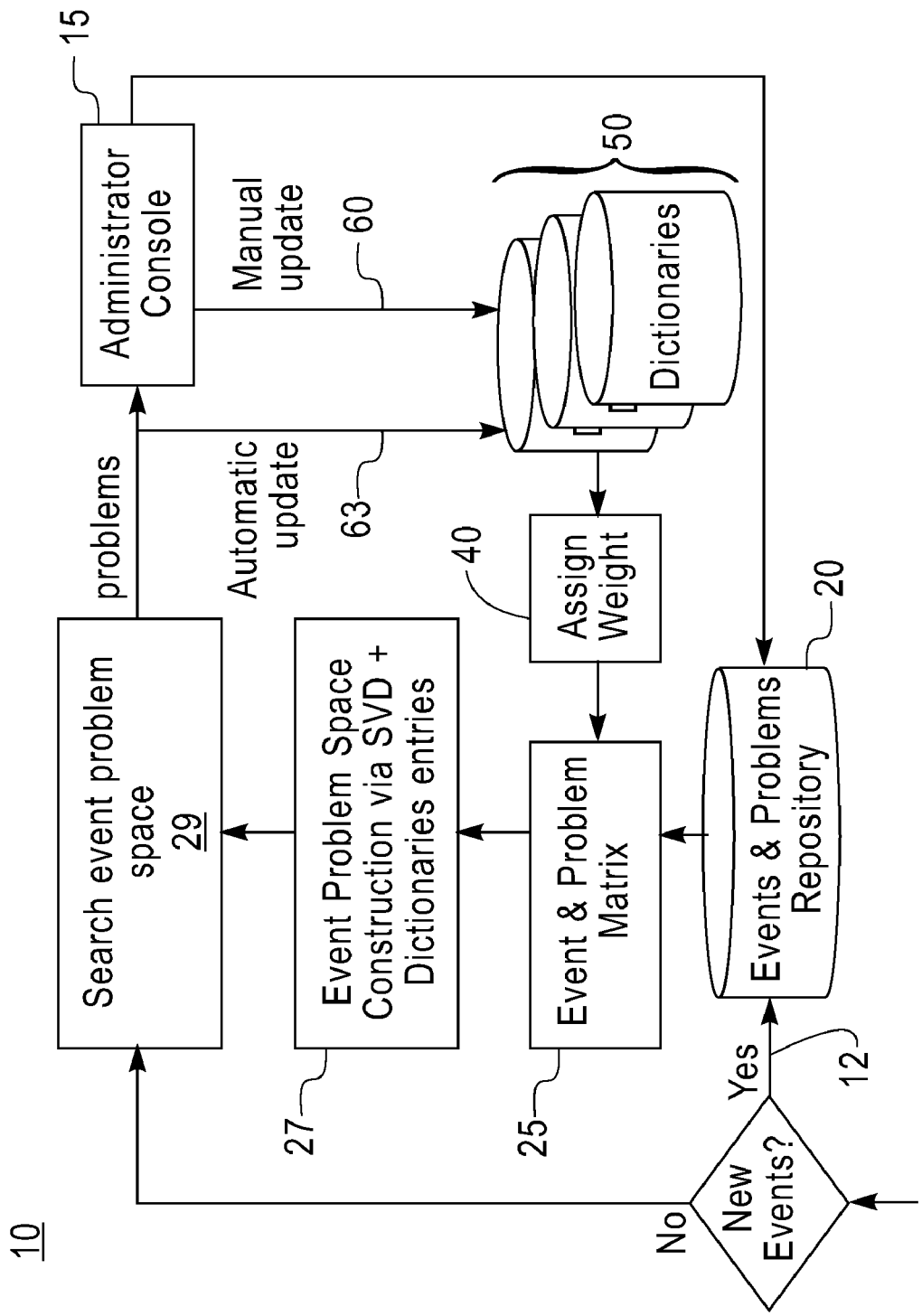
FIG. 1 depicts generally the problem determination system (PDS) of the present invention.

FIG. 1 shows the overview of the PDS system 10 of the present invention. Tic PDS system 10 includes an event bus 12, an administrator console 15 for enabling user administration/interaction with the system, and, an event/problem (EP) repository 20 such as a database or like memory storage structures for receiving and storing events and problems patterns that are communicated to it via an event bus 12. For example, in one example application involving a typical IT environment, there are thousands of events reporting system faults, status and performance information. New events may also appear due to the on-demand operations, and the occurrences of these events are unpredictable. Moreover, new events and conditions also appear as operating environment changes. The communication of such event data to the EP repository may be computer network based, e.g., by transmission over wired or wireless communications links to the event bus.

An EP matrix generation module 25 is coupled to the EP repository 20 for receiving initial event-problem sets and transforming an initial event-problem (EP) set obtained from the EP repository 20 into an event-problem matrix. An event-problem space construction module 27 executes functions for decomposing the event-problem matrix—utilizing an SVD technique—to construct an n-dimensional event-problem (EP) space—wherein events and closely associated problems are plotted near one another. One SVD technique in general that may be used according to the invention is described in the reference entitled "Singular Value Factorization." §3.2.7 in *Numerical Linear Algebra for Applications in Statistics*, by Gentle, J. E. Berlin: Springer-Verlag, pp. 102-103, 1998, the whole contents and disclosure of which is incorporated by reference herein.

Figure 2:
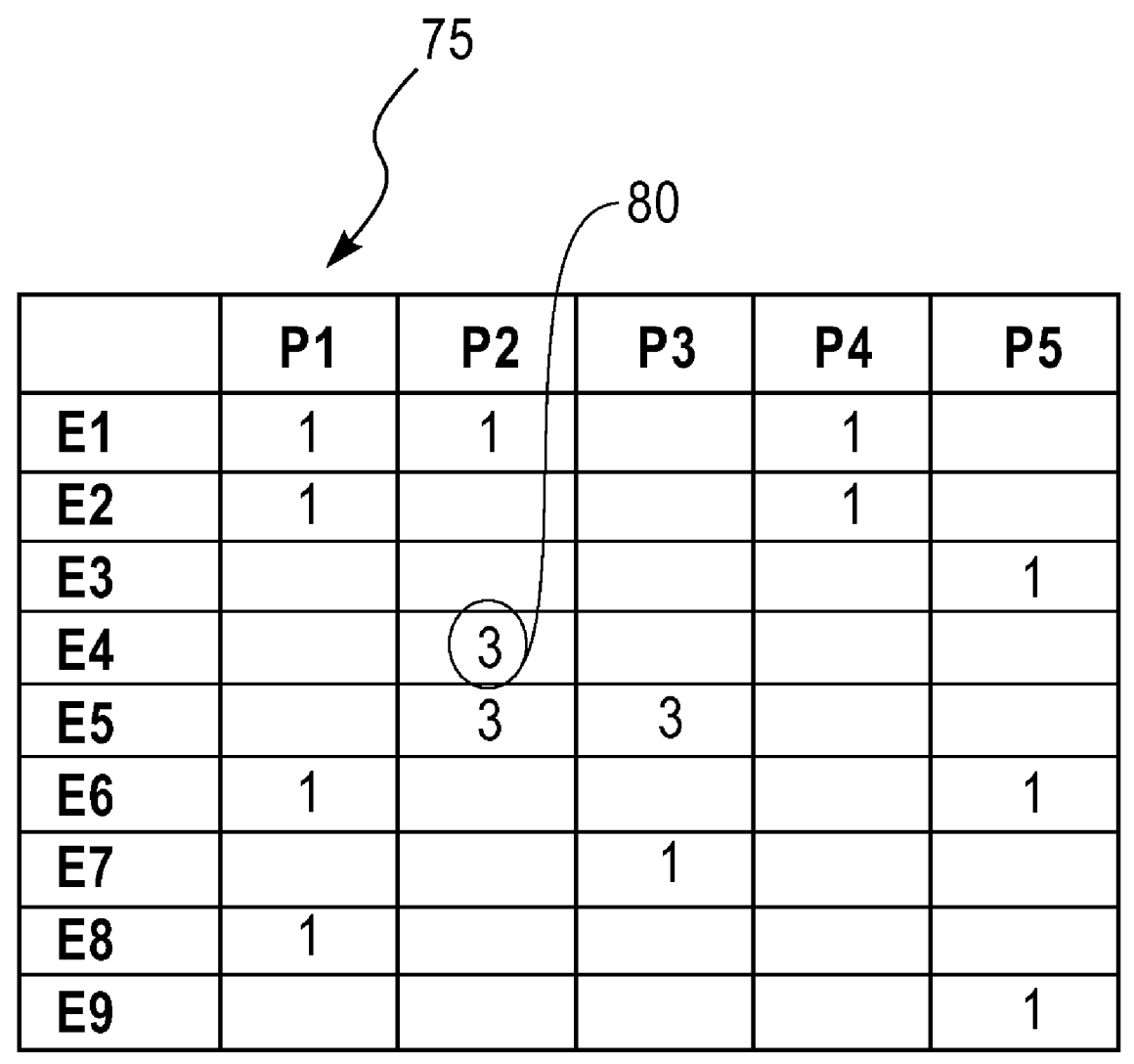

For ease of illustration and depicting operation of the invention, a simplified set of security problems P1-P5 is shown in FIG. 2, e.g., that govern computer usage events generally as indicated as events E1-E9 and, particularly govern a user's IP network connectivity. As shown in FIG. 2, the example set of security events relating to problems P1-P5 include, in a non-limiting example:

E1=more than 25 failed logins in 5 minutes,
E2=more than 25 logins by a single user/IP,
E3=excessive logins in the entire system,
E4=excessive logins in a domain,
E5=excessive logins in an individual server,
E6=excessive accounts are blocked by security,
E7=excessive FTP connections,
E8=connection established to suspicious IP,
E9=excessive unknown application terminations, and Potential problems associated with these event sets may comprise, in a non-limiting example, one or more of: IP network problems, sever problems, user account problems, breach of security problem, CPU utilization problem, multiple failed logon attempts, disk space shortage problem, storage cluster problems, etc.

Referring to FIG. 1, as indicated at 29, in this manner, problems that are closely associated with the incoming events in this EP space are detected from the EP space and potentially selected by an Administrator. For reasons as will be further described herein below, according to the invention, one or more multi-levels dictionaries 50 are provided that are implemented to assign a weight 40 to each term in the EP matrix prior to its transformation into the EP space. It is understood that Administrators, through the administrative console 15, can accept, reject or modify the detected problems. Each episode of problem detection triggers the system to update the EP repository 20 by putting a positive or negative weight on certain EP patterns. This is represented by the assigned weight block 40 shown in FIG. 1.

More particularly, the computer-implemented system and methodology enables a multi-levels dictionary 50 to assign a weight to each term in the EP matrix. The level of the dictionary indicates complexity of terms, for example, the first level contains only atomic terms, while a higher level dictionary includes combination of terms. A non-limiting example of first level (atomic) terms included in the dictionary include: connectionException, indexOutOfBound, timeout, NullPointerException. Examples of higher level (combinations) terms include complex terms such as storageSocketconnectionException, main memory low warnings, unhandled exception, etc. Each dictionary 50 is optionally initialized with expert defined entries, and each entry is assigned an Occurrence Index (OI). In one example PDS system implementation, the occurrence index is directly proportional to occurrence frequency of the term and inversely proportional to time elapsed since last occurrence as set forth in equation 1) as follows:

$$OI=(F*B)/T \quad\quad\quad 1)$$

where F=occurrence of term for a fixed time interval, B=user input weight (e.g., 0 to infinity, default=1), and T=elapsed time from last occurrence of term. The OI for each term is updated at the multi-levels dictionaries 50 as events are received via the events bus and problems detected. New terms can be added to the multi-levels dictionaries as new events occur. Thus, the dictionaries 50 and the EP repository 20 provide an adaptive knowledge base for up-to-date problem determination. That is, the system and method of the invention is responsive to and implements a feedback mechanism in which the output of the problem determination will trigger the re-calculation of the OI index of each associated term in the dictionaries resulting in a gradual evolution of the dictionaries to accumulate expert knowledge. A successful problem determination situation will increase the weights of the related terms, while a failed problem determination situation will decrease the weights of the related terms, resulting in adaptive behavior.

In an embodiment of the method of the present invention, events received via the events bus and the associated problems are input to the repository 20. Then, an SVD operation including a data dictionary (DD) look-up operation is performed for each term in the EP matrix, resulting in a new matrix. As a simplified example, FIG. 2 illustrates an example EP matrix representative of nine (9) example event types, e.g., E1-E9, and the associated example problems as P1-5 after dictionary look-up. That is, as shown in FIG. 2, the "m" events are entered as rows and the "n" problems are entered as columns in the m×n correlation matrix R. For the SVD-DD implementation of the present invention, the data dictionary lookup operation is performed for each term in the EP matrix, resulting in the matrix "R" such as the matrix 75 shown in FIG. 2. In the example matrix 75 shown in FIG. 2 an occurrence index-based normalized weight, such as weight 80 for event E4, is assigned to each term. Particularly, in the example depicted, events E4 and E5 have new assigned weights equal to "3" instead of "1" for a SVD based EP set. Then, according to the invention, the matrix R is decomposed into three matrices by use of a well-known SVD technique as set forth in equation 2) as follows:

$$R = E\ S\ P' \qquad (2)$$

where E and P' are the correlation EP matrices of left and right singular vectors, and S is the diagonal matrix of singular values. That is, the entries in the correlation (EP) matrix reflect the number of times the corresponding event or circumstances appears in the corresponding problem. According to the invention, these special matrices E, S and P' are the result of a breakdown of the original event-problem relationships such as shown in the data set of FIG. 2 into linearly independent event and problem (or policy) components. Consequently, each event or problem is represented by a respective vector.

Figure 3:
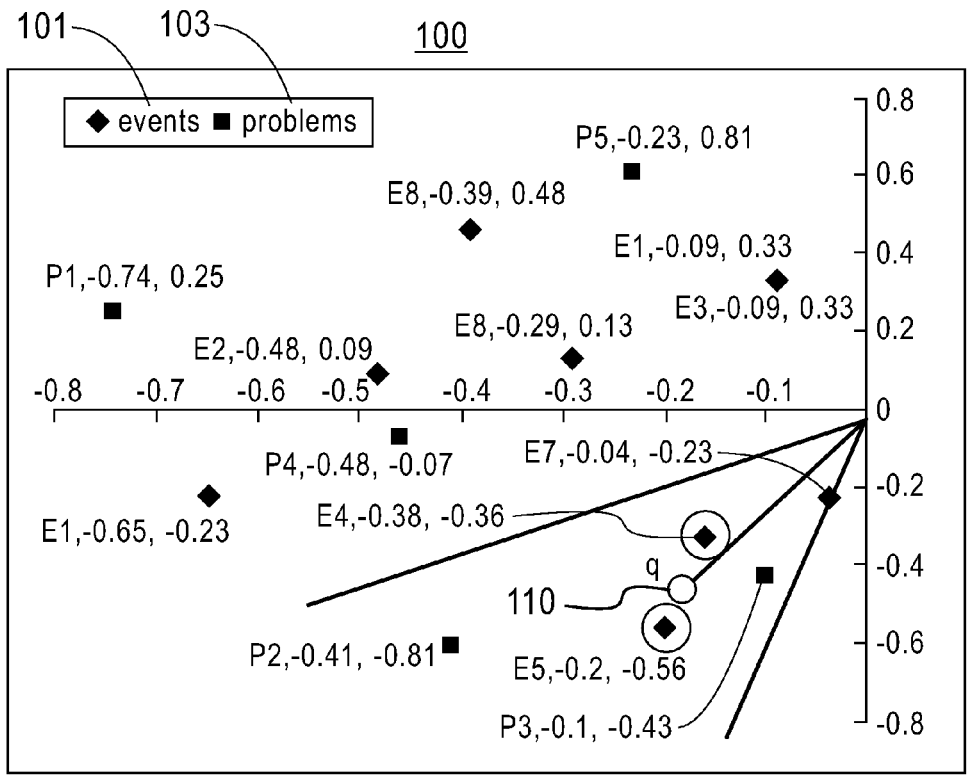
FIG. 3 depicts an example plot 100 of the events and problems (EP) space for the example EP matrix representative of the example 9 event/5 problem set including shown in FIG. 2; and, FIG. 4 depicts a scenario including choosing of the largest two singular values for a two dimensional space which represents the major correlation among events and problems for the example plot 100 shown in FIG. 3.

FIG. 3 depicts an example plot 100 of the events and problems (EP) space for the example EP matrix representative of the nine (9) example event types, e.g., E1-9, and the associated example problems P1-5 shown in FIG. 2. In the plot 100 of FIG. 3, events E1-9 are represented as vectors including diamonds 101 and problems P1-5 represented as squares 103. The dot product (cosine) between two component vectors corresponds to their estimated similarity.

Figure 4:
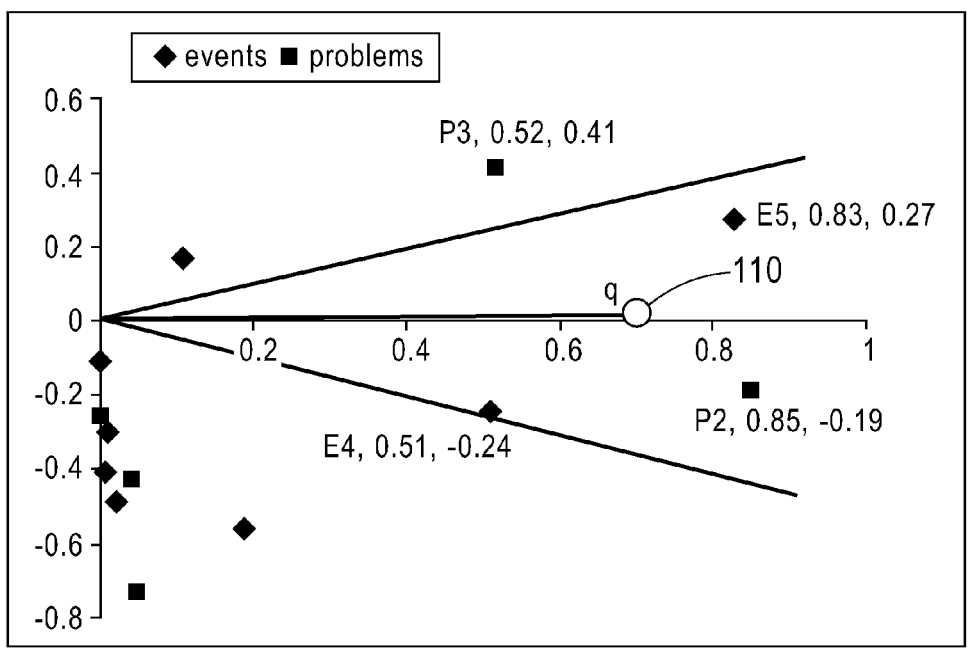

In one illustrative example, FIGS. 3 and 4 depict a scenario including choosing of the largest two singular values for a two dimensional space which represents the major correlation among events and problems. As shown in FIG. 2, matrix R is the two dimensional space and using standard SVD it is seen that for incoming events E4 and E5 there is no exact match in the EP patterns. A pseudo-problem, indicated at point "q" 110 in FIG. 3, is constructed from vectors E4 and E5 as the centroid of vectors E4 and E5. As shown in FIG. 3 and the related view of FIG. 4, two potential problems, P2, P3 are selected as they are within a dotted cone with a cosine value of 0.7 from the plot of the centroid "q" 110.

Thus, with the same events E4 and E5 and SVD-DD, a pseudo-problem (point q 110 in FIG. 4) is constructed from E4 and E5, with P2 being the sole problem within the dotted cone (cosine value of 0.7 from q) and P3 is outside the cone. This amounts to a more precise problem detection than standard SVD and it can be achieved with less computation time. If the administrator accepts the result, e.g., via manual update path 60 shown in FIG. 1, the data dictionary 50 will be updated. Events E4 and E5 which lead to P2, will also be recorded as new pattern in the EP repository 50 for subsequent uses, completing the feedback loop for interactive learning. In this manner, expert knowledge is enabled to be expressed as an index via manual 60 input or automatic 63 update with the feedback mechanism.

Thus, the system of the invention implements an iterative method that enables dynamic interaction between events and the current dictionaries with its entries being continuously updated. Updating the dictionaries triggers an update of the SVD matrix, thereby accelerating its convergence. The system captures knowledge in a hierarchical form for complex knowledge representation. For example, there are levels of knowledge which can be captured by the user input or observing system configuration. For example, a "highest" level of an instance of knowledge is Exception; under the general knowledge Exception, there are storageDeviceExceptions, connectionExceptions, and under storageDeviceExceptions, there are database exceptions, disk exceptions, etc. It does not require a formal knowledge model or intensive training by examples. It is efficient with sufficient accuracy for autonomic problem determination.

The feedback mechanism employed for the multi-level dictionary system and method of the invention in which the output of the problem determination will trigger the recalculation of the index of each associated term in the dictionaries, results in gradual evolution of the dictionaries to accumulate expert knowledge. A successful problem determination situation will increase the weights of the related terms, while a failed problem determination situation will decrease the weights of the related terms, resulting in adaptive behavior.

This multi-level dictionary system is portable, meaning the accumulated knowledge can be treated as an independent entity and shared among other problem determination problems.

The present invention has been described with reference to flow diagrams and/or block diagrams of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or Rows and/or block diagram block or blocks.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described my invention, what we claim as new, and desire to secure by Letters Patent is:

1. A computer implemented method for problem determination in a computing system, the method comprising:
   providing a database accessible by a computer device;
   providing to said database data representing events and problems patterns received from a computing system resource, said problem determining comprising associating a potential source of problems with received events;
   configuring received events and potential problems associated with these events as entries into an adaptive event-problem (EP) matrix;
   providing a storage device having dictionary entries comprising a weighting factor associated with one or more terms in said EP matrix and representative of the relative importance of said one or more terms;
   applying a weighting factor to said one or more terms in said EP matrix; and,
   utilizing a Singular Value Decomposition (SVD) technique on said EP matrix having said weighted terms to construct an event-problem data structure representing an event-problem vector space comprising associative patterns and correlations in the event-problem data structure,
   wherein the use of weighted terms in said SVD technique enables an accelerated and accurate convergence to a set of specific associated problems for accurate and rapid problem determination.

2. The computer implemented method as claimed in claim 1, further comprising: updating one or more current weighting factor entries to maximize correlation among the events and problems.

3. The computer implemented method as claimed in claim 1, wherein said weighting factor associated with one or more terms in an EP matrix comprises an Occurrence Index (OI) representative of that term's relative importance, said OI index of each entry in the dictionary being used to calculate the weight of each event in the EP matrix.

4. The computer implemented method as claimed in claim 3, wherein said OI is a value governed according to:

$$OI = (F*B)/T$$

where F is the occurrence frequency of the term for a fixed time interval, B is a user input real number greater than zero (0) and having a default value of one (1), and T is a time elapsed since the last occurrence of the term.

5. The computer implemented method as claimed in claim 4, further comprising: updating each OI for each entry in the dictionary as events are received and problems detected.

6. The computer implemented method as claimed in claim 1, wherein said storage device having dictionary entries is a multi-level structure dictionary expressing terms in increasing complexity for assigning weights to the EP matrix terms, wherein a first level dictionary includes atomic terms, and a higher level dictionary includes combination of terms.

7. The computer implemented method as claimed in claim 5, wherein said updating comprises: utilizing a feedback mechanism in which an output of the problem determination triggers the recalculation of the OI of each associated term in the dictionaries.

8. The computer implemented method as claimed in claim 7, wherein said feedback mechanism is manually implemented.

9. The computer implemented method as claimed in claim 7, wherein said feedback mechanism is automatically implemented.

10. The computer implemented method as claimed in claim 7, exhibiting adaptive behavior wherein a successful problem determination situation results in increasing the weights of the associated terms, while a failed problem determination situation results in decreasing the weights of the associated terms.

11. A system for problem determination in a computing system comprising:
    a processor, comprising;
    a first database accessible by a computer device having data representing events and problems patterns received from a computing system resource, said problem determining comprising associating a potential source of problems with received events;
    configuring received events and potential problems associated with these events as entries into a representative event-problem (EP) matrix;
    a second database accessible by a computer device having dictionary entries comprising a weighting factor associated with one or more terms in said EP matrix and representative of the relative importance of said one or more terms;
    means for applying a weighting factor to said one or more terms in said EP matrix, and, said means further utilizing a Singular Value Decomposition (SVD) technique on said EP matrix having said weighted terms to construct an event-problem data structure representing an event-problem vector space comprising associative patterns and correlations in the event-problem data structure,
    wherein the use of weighted terms in said SVD technique enables an accelerated and accurate convergence to a set of specific associated problems for accurate and rapid problem determination.

12. The system as claimed in claim 11, wherein said means utilizing a Singular Value Decomposition on said EP matrix further includes means for updating one or more current weighting factor entries to maximize correlation among the events and problems.

13. The system as claimed in claim 11, wherein said weighting factor associated with one or more terms in an EP matrix comprises an Occurrence Index (OI) representative of that term's relative importance, said OI index of each entry in the dictionary being used to calculate the weight of each event in the EP matrix.

14. The system as claimed in claim 13, wherein said OI is a value governed according to:

$$OI=(F*B)/T$$

where F is the occurrence frequency of the term for a fixed time interval, B is a user input real number greater than zero (0) and having a default value of one (1), and T is a time elapsed since the last occurrence of the term.

15. The system as claimed in claim 14, further comprising: updating each OI for each entry in the dictionary as events are received and problems detected.

16. The system as claimed in claim 11, wherein said storage device having dictionary entries is a multi-level structure dictionary expressing terms in increasing complexity for assigning weights to the EP matrix terms, wherein a first level dictionary includes atomic terms, and a higher level dictionary includes combination of terms.

17. The system as claimed in claim 15, wherein said means for updating utilizes a feedback mechanism in which an output of the problem determination triggers the recalculation of the OI of each associated term in the dictionaries, said feedback mechanism being manually implemented or automatically implemented.

18. The system as claimed in claim 17, exhibiting adaptive behavior wherein a successful problem determination situation results in increasing the weights of the related terms, while a failed problem determination situation results in decreasing the weights of the related terms.

19. A program storage device readable by a machine, tangibly embodying a program of instructions executable by the machine to perform method steps for problem determination, the method comprising:

providing a database accessible by a computer device;

providing to said database data representing events and problems patterns received from a computing system resource, said problem determining comprising associating a potential source of problems with received events;

configuring received events and potential problems associated with these events as entries into a representative event-problem (EP) matrix;

providing a storage device having dictionary entries comprising a weighting factor associated with one or more terms in said EP matrix and representative of the relative importance of said one or more terms;

applying a weighting factor to said one or more terms in said EP matrix; and, utilizing a Singular Value Decomposition (SVD) technique on said EP matrix having said weighted terms to construct an event-problem data structure representing an event-problem vector space comprising associative patterns and correlations in the event-problem data structure, wherein the use of weighted terms in said SVD technique enables an accelerated and accurate convergence to a set of specific associated problems for accurate and rapid problem determination.

20. The program storage device readable by a machine as claimed in claim 19, further comprising: updating one or more current weighting factor entries to maximize correlation among the events and problems.

* * * * *